(12) United States Patent
Mckinley et al.

(10) Patent No.: US 11,970,228 B2
(45) Date of Patent: Apr. 30, 2024

(54) DOCKING STATION FOR SUPPORTING A REMOTE WIRELESS CAB

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Mark Mckinley, Wauwatosa, WI (US); Steven Melotik, Kenosha, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD., Changsha Hunan Province (CN)

( * ) Notice: Subject to any disclaimer, the term of this patent is extended or adjusted under 35 U.S.C. 154(b) by 326 days.

(21) Appl. No.: 17/584,974

(22) Filed: Jan. 26, 2022

(65) Prior Publication Data
US 2023/0234658 A1    Jul. 27, 2023

(51) Int. Cl.
| | |
|---|---|
| *B62D 63/00* | (2006.01) |
| *B60K 1/00* | (2006.01) |
| *B62D 33/06* | (2006.01) |
| *F15B 15/20* | (2006.01) |
| *G05G 1/04* | (2006.01) |
| *G05G 1/44* | (2008.04) |
| *G08C 17/00* | (2006.01) |

(52) U.S. Cl.
CPC ............... *B62D 63/00* (2013.01); *B60K 1/00* (2013.01); *B62D 33/0617* (2013.01); *F15B 15/20* (2013.01); *G05G 1/04* (2013.01); *G05G 1/44* (2013.01); *G08C 17/00* (2013.01)

(58) Field of Classification Search
CPC ...... B62D 63/00; B62D 33/0617; B60K 1/00; F15B 15/20; G05G 1/44; G08C 17/00
See application file for complete search history.

(56) References Cited

U.S. PATENT DOCUMENTS

| | | | | |
|---|---|---|---|---|
| 4,421,204 A | * | 12/1983 | Lawrence | A62B 5/00 |
| | | | | 182/51 |
| 4,451,079 A | * | 5/1984 | Takahashi | B62D 33/067 |
| | | | | 296/190.07 |
| 4,566,553 A | * | 1/1986 | McCutcheon | B62D 49/0607 |
| | | | | 180/246 |
| 5,520,259 A | * | 5/1996 | Onohara | B62D 33/0608 |
| | | | | 180/89.15 |

(Continued)

*Primary Examiner* — Erez Gurari
(74) *Attorney, Agent, or Firm* — Donald J. Ersler

(57) ABSTRACT

A docking station may be used to provide a physical foundation and an operational base for a remote wireless cab. The docking station preferably includes a base member, a hydraulic pump and an electrical generator. The hydraulic pump is not needed for a remote wireless electric cab. The base member includes a support base and at least two upright mounting members. The at least two upright mounting members extend upward from the support base. The hydraulic pump and the electrical generator are preferably attached to a top surface of the support base. A remote wireless cab is attached to the at least two upright mounting members. The hydraulic pump is connected to the hydraulic pressure and return lines. The electrical generator is connected to the electrical bulkhead through the power cable. The remote wireless cab may be operated with the docking station.

15 Claims, 10 Drawing Sheets

(56) References Cited

U.S. PATENT DOCUMENTS

| | | | | |
|---|---|---|---|---|
| 5,623,410 A * | 4/1997 | Furihata | B62D 33/0608 | 296/190.07 |
| 6,148,551 A * | 11/2000 | Glass | G09F 21/08 | 40/610 |
| 6,374,935 B1 * | 4/2002 | Kirschenmann | B62D 33/0604 | 180/89.12 |
| 8,182,024 B2 * | 5/2012 | Hayes | B62D 33/067 | 296/190.07 |
| 8,240,745 B2 * | 8/2012 | Yamamoto | E02F 9/163 | 296/190.01 |
| 10,343,729 B2 * | 7/2019 | Benevelli | B62D 33/0604 | |
| 10,647,364 B2 * | 5/2020 | Tilp | B62D 33/071 | |
| 11,203,853 B2 * | 12/2021 | Lee | B62D 33/0604 | |
| 11,718,355 B2 * | 8/2023 | Patrick | B62D 33/0604 | 296/190.07 |
| 11,807,310 B2 * | 11/2023 | Takaoka | B62D 33/0604 | |
| 2006/0197308 A1 * | 9/2006 | Shmueli | B64B 1/66 | 280/400 |
| 2012/0193157 A1 * | 8/2012 | Rasset | B62D 33/0604 | 180/89.13 |
| 2015/0239510 A1 * | 8/2015 | Davisdon | E02F 9/163 | 296/35.1 |
| 2016/0010310 A1 * | 1/2016 | Schmidt | E02F 3/432 | 701/2 |
| 2016/0031494 A1 * | 2/2016 | Kinoshita | B62D 33/0604 | 296/190.07 |
| 2017/0233015 A1 * | 8/2017 | Knutson | E02F 9/2004 | 296/190.05 |
| 2018/0201331 A1 * | 7/2018 | Helm | B62D 33/0617 | |
| 2019/0071137 A1 * | 3/2019 | Venugopal | B62D 33/0617 | |
| 2021/0046978 A1 * | 2/2021 | Forostovsky | B60G 3/20 | |
| 2021/0122431 A1 * | 4/2021 | Kazimiers | B62D 33/0617 | |
| 2022/0018093 A1 * | 1/2022 | Das | B62D 33/0617 | |
| 2022/0105995 A1 * | 4/2022 | Zhang | E02F 9/163 | |
| 2023/0070893 A1 * | 3/2023 | Nagao | F15B 13/044 | |
| 2023/0132968 A1 * | 5/2023 | Melotik | B62D 33/0604 | 248/636 |
| 2023/0134022 A1 * | 5/2023 | McKinley | B62D 33/0604 | 296/190.07 |
| 2023/0229157 A1 * | 7/2023 | McKinley | E02F 9/163 | 701/2 |
| 2023/0234658 A1 * | 7/2023 | McKinley | B62D 63/00 | 180/167 |

* cited by examiner

DOCKING STATION FOR SUPPORTING A REMOTE WIRELESS CAB

BACKGROUND OF THE INVENTION

1. Field of the Invention

The present invention relates generally to heavy equipment and more specifically to a docking station for supporting a remote wireless cab, which is used in conjunction with a remote wireless frame.

2. Discussion of the Prior Art

The remote wireless frame is located a distance from the remote wireless cab. The remote wireless frame includes at least one tool, such as a shovel. The remote wireless cab communicates wirelessly with the remote wireless frame. The remote wireless cab may be either a remote wireless hydraulic cab or a remote wireless electric cab. The remote wireless hydraulic cab includes at least one hydraulicly operated device and include at least one electrical control device. The remote wireless electric cab only includes at least one electrical control device. The wireless communication may be implemented with any suitable wireless protocol. The remote wireless hydraulic cab includes hydraulic operated joysticks and foot treadles, which must be supplied with hydraulic fluid to operate the at least one tool. The remote wireless hydraulic cab is supplied with electrical power through an electrical generator and pressurized hydraulic fluid through a hydraulic pump. The inputs from the hydraulic joysticks and foot treadles are converted into electrical signals and transmitted wirelessly to the remote wireless hydraulic frame. Electrical signals from the at least one electrical control device are transmitted wirelessly to the remote wireless hydraulic frame.

The remote wireless hydraulic frame receives electrical signals from the remote wireless hydraulic cab or the remote wireless electric cab and converts the wireless electrical signals for controlling a plurality of hydraulic valves. It appears that the prior art does not teach or suggest a system for remote wireless operation of at least one tool on a remote wireless frame by a remote wireless hydraulic cab, or a remote wireless electric cab.

Accordingly, there is clearly felt need in the art for a docking station for supporting a remote wireless cab, which is used in conjunction with a remote wireless frame.

SUMMARY OF THE INVENTION

The present invention provides a docking station for supporting a remote wireless cab, which is used in conjunction with a remote wireless frame. A remote wireless hydraulic cab preferably includes a cab member, an electrical bulkhead, a cab bridge controller and a cab transceiver. The cab member preferably includes a cab enclosure, a plurality of hydraulic joysticks, a plurality of hydraulic treadles, a plurality of hydraulic lines and a plurality of electrical control devices. One end the plurality of hydraulic lines are connected to the plurality of joysticks and the plurality of hydraulic treadles. Two of the plurality of hydraulic lines are a hydraulic pressure line and a hydraulic return line.

The hydraulic pressure line, the hydraulic return line and the plurality of hydraulic joysticks and hydraulic treadles are connected to a hydraulic circuit block. An opposing end of the plurality of hydraulic lines may be retained in a hydraulic sensor plate. A plurality of quick disconnect adapters extent from one side of the hydraulic sensor plate and a plurality of threaded adapters extend from an opposing side of the hydraulic sensor plate. The plurality of quick disconnect adapters are sized to receive the opposing end of the plurality of hydraulic lines. The plurality of hydraulic pressure sensors are threaded into plurality of threaded adapters. Hydraulic pressure in the plurality of hydraulic lines are measured by the plurality of hydraulic pressure sensors. An electrical output from each hydraulic pressure sensor is connected to the cab bridge controller. The electrical bulkhead includes a signal socket and a power socket. A signal cable includes a bulkhead plug extending from one end and a controller plug extending from an opposing end. The bulkhead plug is plugged into the signal socket and the controller plug is plugged into the cab bridge controller for transfer of electrical signals from the cab member to the cab bridge controller. A vehicle controller is preferably used to receive electrical signals from a button panel. The vehicle controller is also used to display information to an operator display. The vehicle controller is also connected to the cab bridge controller.

An output from the cab bridge controller is connected to the cab transceiver. The cab transceiver transmits the plurality of electrical signals from the plurality of hydraulic pressure sensors and electrical signals from the vehicle controller through the signal socket. A hydraulic pump is connected to the hydraulic pressure and return lines. A power cable includes a generator plug on one end and a power plug on an opposing end. The generator plug is connected to an electrical generator and the power plug is plugged into the power socket. With the hydraulic pump and the electric generator connections, the remote wireless hydraulic cab is capable of operating remotely from a remote wireless hydraulic frame through wireless communication. A remote wireless electric cab only includes at least one electrical control device.

A docking station may be used to provide a physical foundation and an operational base for the remote wireless hydraulic cab. The docking station includes a base member, a hydraulic pump and an electrical generator. The base member includes a support base and at least two upright mounting members. The at least two upright mounting members extend upward from the support base. A fastener threaded tap or hole is formed through a top of each upright mounting members. The hydraulic pump and the electrical generator are preferably attached to a top surface of the support base. A hydraulic remote wireless cab is attached to the at least two upright mounting members with four fasteners. The hydraulic pump is connected to the hydraulic pressure and return lines. The electrical generator is connected to the electrical bulkhead through the power cable. The remote wireless hydraulic cab may be operated with the docking station.

The remote wireless hydraulic frame preferably includes a frame member, a frame transceiver, a frame bridge controller and an electro-hydraulic conversion valve. The frame member preferably includes a frame support, an engine, a hydraulic pump, at least one electrical component and at least one tool. The engine, the hydraulic pump, the at least one electrical component and the at least one tool are retained on the frame support. The electro-hydraulic conversion valve preferably includes a valve block, a plurality of proportioning valves, at least two shuttle valves and a frame pilot hydraulic circuit. The valve block includes a plurality of proportioning threaded taps for receiving the plurality of proportioning valves, a high side inlet for receiving pressurized hydraulic fluid for the plurality of proportioning valves from the frame pilot hydraulic circuit; a return outlet for return hydraulic fluid from the plurality of proportioning valves to a tank; and a plurality of supply outlets for supplying various hydraulic components with pressurized hydraulic fluid. A supply passage is formed in the valve block to supply the plurality of proportioning valves with hydraulic fluid from the frame pilot circuit. A return passage is formed in the valve block to receive hydraulic fluid from the plurality of proportioning valves. A supply outlet of each proportioning valve supplies hydraulic pressurized hydraulic to a particular hydraulicly operated component. An output pressure of each proportion valve is determined by a hydraulic electrical signal sent from the remote wireless hydraulic cab through the frame bridge controller.

The hydraulic electrical signal originates at a hydraulic control device, such as the joystick or a foot treadle. A control electrical signal originates from an electrical control panel or a display touch screen. The electrical control panel includes a plurality of buttons and knobs. The joystick, foot treadle, electrical control panel and display touch screen are located in the remote wireless hydraulic cab. A hydraulic pressure transmitted from the joystick or foot treadle is converted into a hydraulic electrical signal by the hydraulic pressure sensor. The hydraulic electrical signals and control electrical signals are sent to the cab bridge controller. The plurality of hydraulic electrical signals and control electrical signals are converted into a suitable protocol by the cab bridge controller and sent to the cab transceiver. The cab transceiver wirelessly transmits the hydraulic and control electrical signals to the frame transceiver.

The frame bridge controller receives the hydraulic electrical signals and control electrical signals from the frame transceiver and converts the signals into a suitable form. The hydraulic and control electrical signals are sent from the frame bridge controller to the electro-hydraulic conversion valve, a hydraulic controller, an engine controller and at least one electrical component. The hydraulic electrical signals sent to the electro-hydraulic conversion valve operate the plurality of proportioning valves to control the flow of hydraulic fluid to various hydraulicly operated components. The hydraulic lines from the electro-hydraulic conversion valve preferably include quick coupling ends for retention in a plurality of hydraulic connectors in a hydraulic bulkhead. The hydraulic electrical signals are also sent to the hydraulic controller. The control electrical signals go to the engine controller or the at least one electrical component.

Accordingly, it is an object of the present invention to provide a remote wireless hydraulic frame, which is used in conjunction with a remote wireless hydraulic cab for remote operation of the remote wireless hydraulic frame and the at least one tool.

These and additional objects, advantages, features and benefits of the present invention will become apparent from the following specification.

DETAILED DESCRIPTION OF THE PREFERRED EMBODIMENTS

Figure 1:
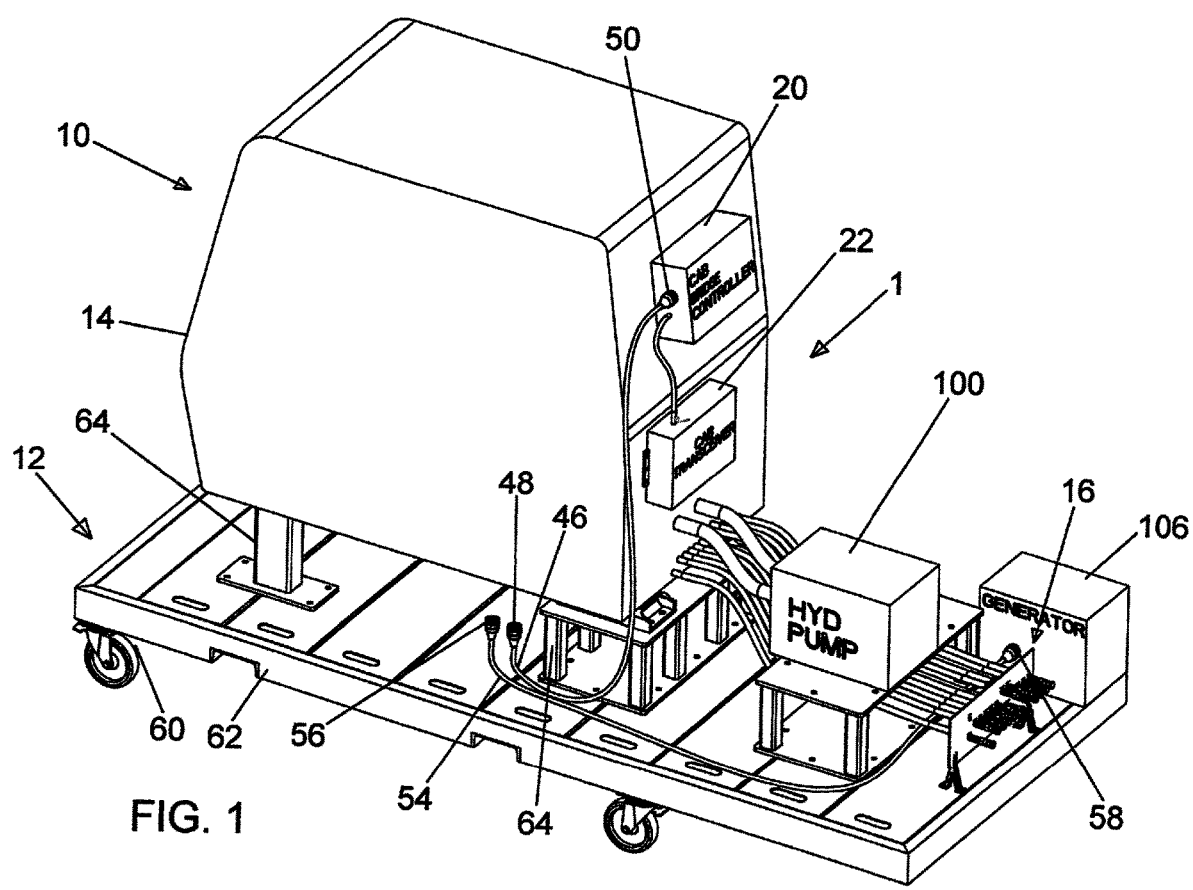
FIG. 1 is a perspective view of a remote wireless hydraulic or electric cab retained on a docking station in accordance with the present invention.
Figure 2:
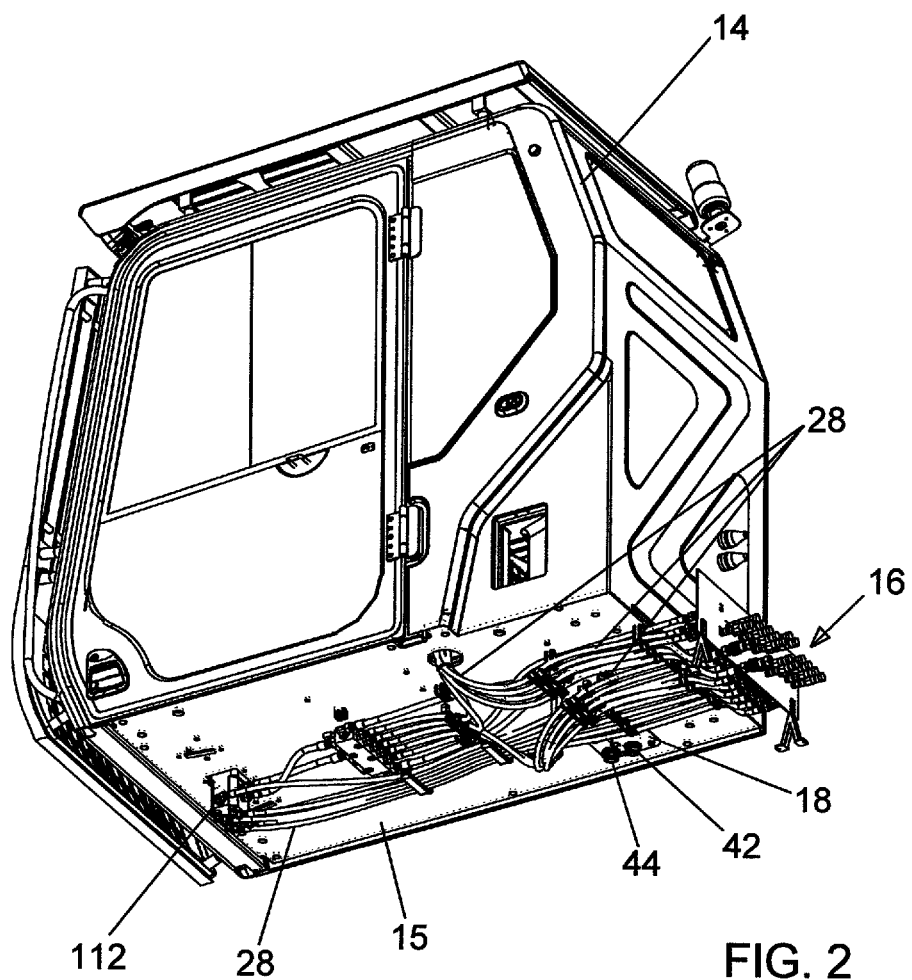
FIG. 2 is a bottom perspective view of a remote wireless hydraulic cab illustrating a plurality of hydraulic lines from a plurality of joysticks and foot treadles connected to a hydraulic sensor plate in accordance with the present invention.
Figure 3:
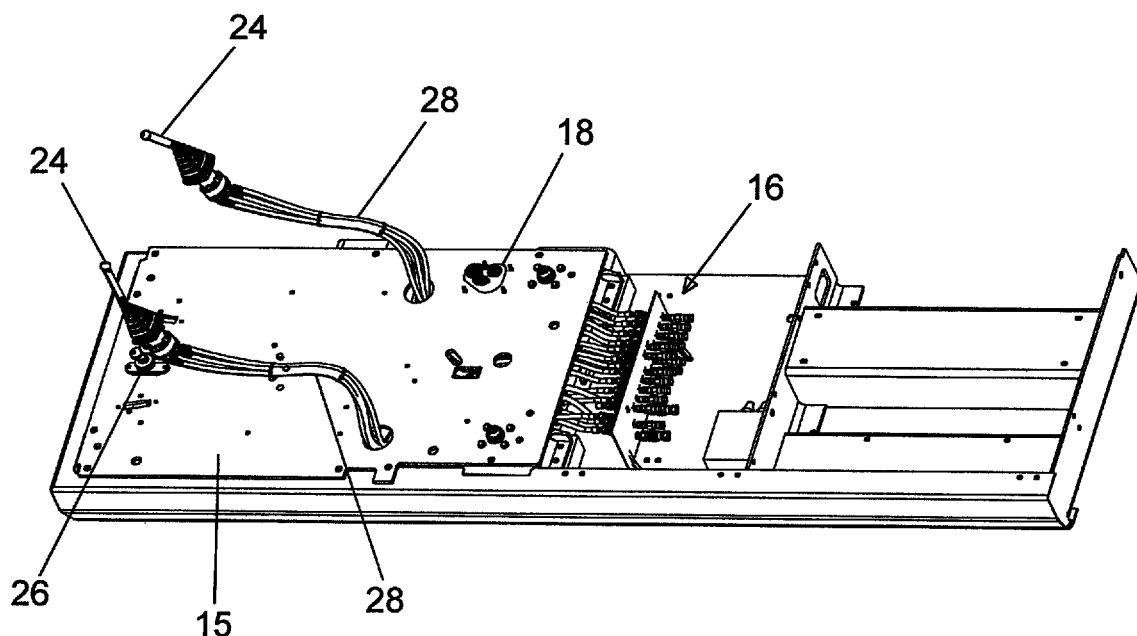
FIG. 3 is a top perspective cutaway view of a remote wireless hydraulic cab illustrating two joysticks and two foot treadles with hydraulic lines connected to a hydraulic sensor plate in accordance with the present invention.
Figure 4:
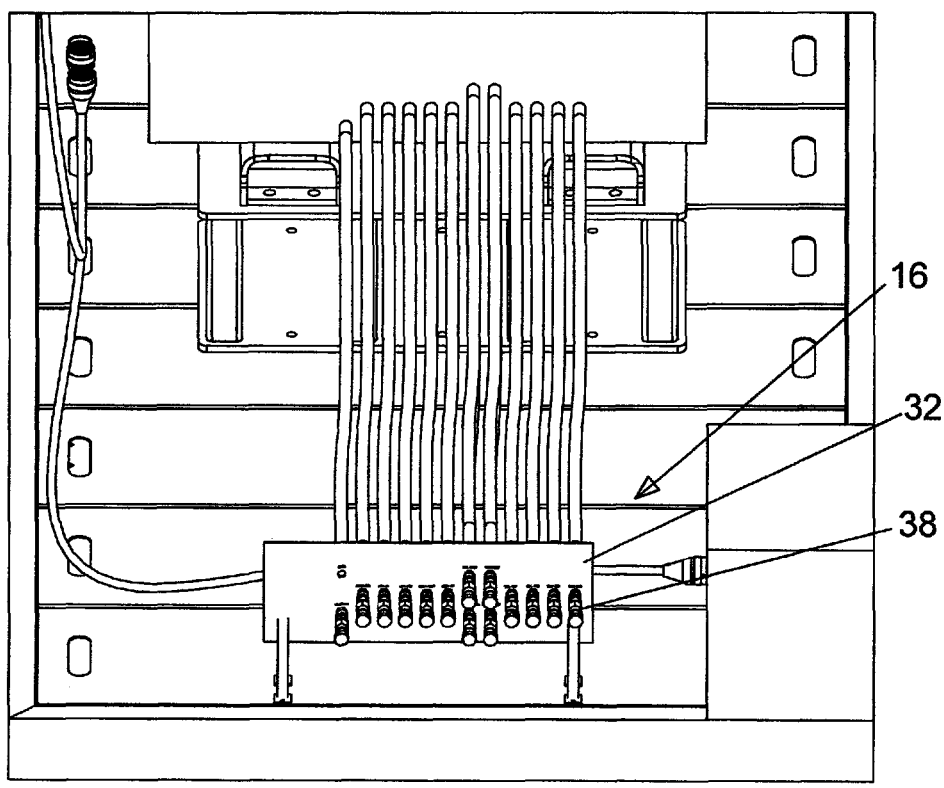
FIG. 4 is a top perspective view of a hydraulic sensor plate of a remote wireless hydraulic cab in accordance with the present invention.
Figure 5:
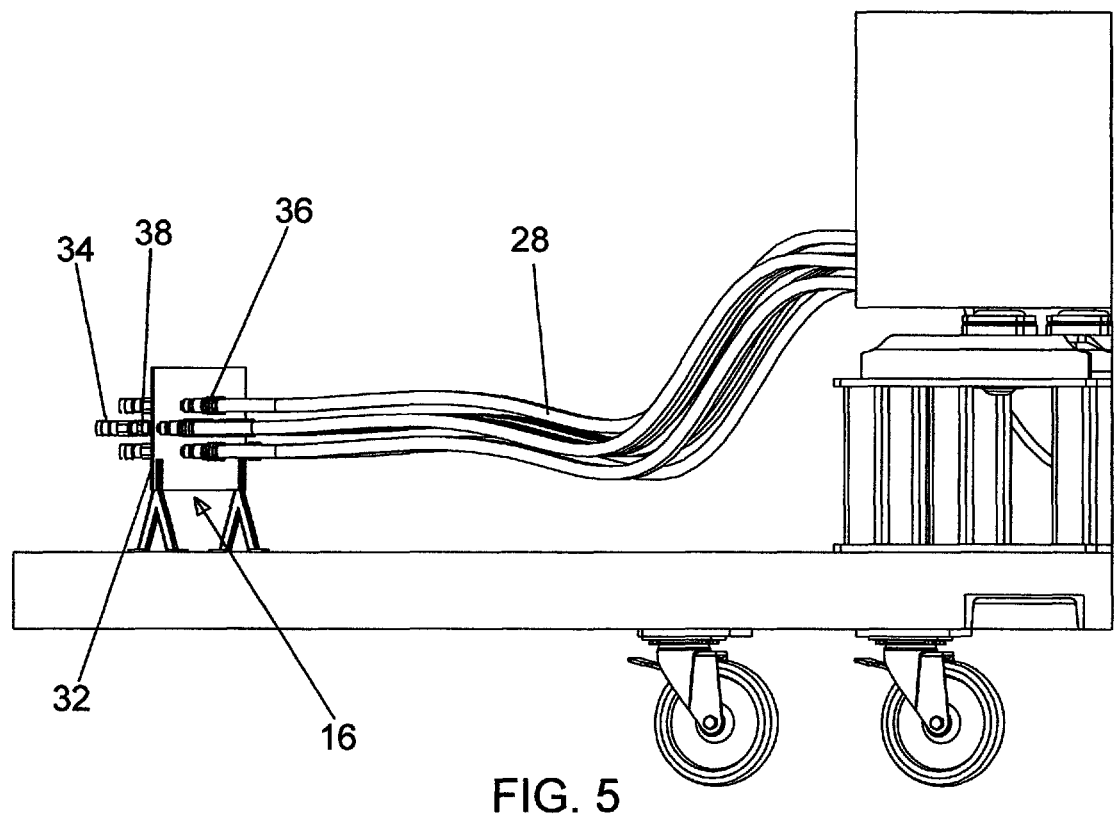
FIG. 5 is an end perspective view of a hydraulic sensor plate of a remote wireless hydraulic cab in accordance with the present invention.
Figure 6:
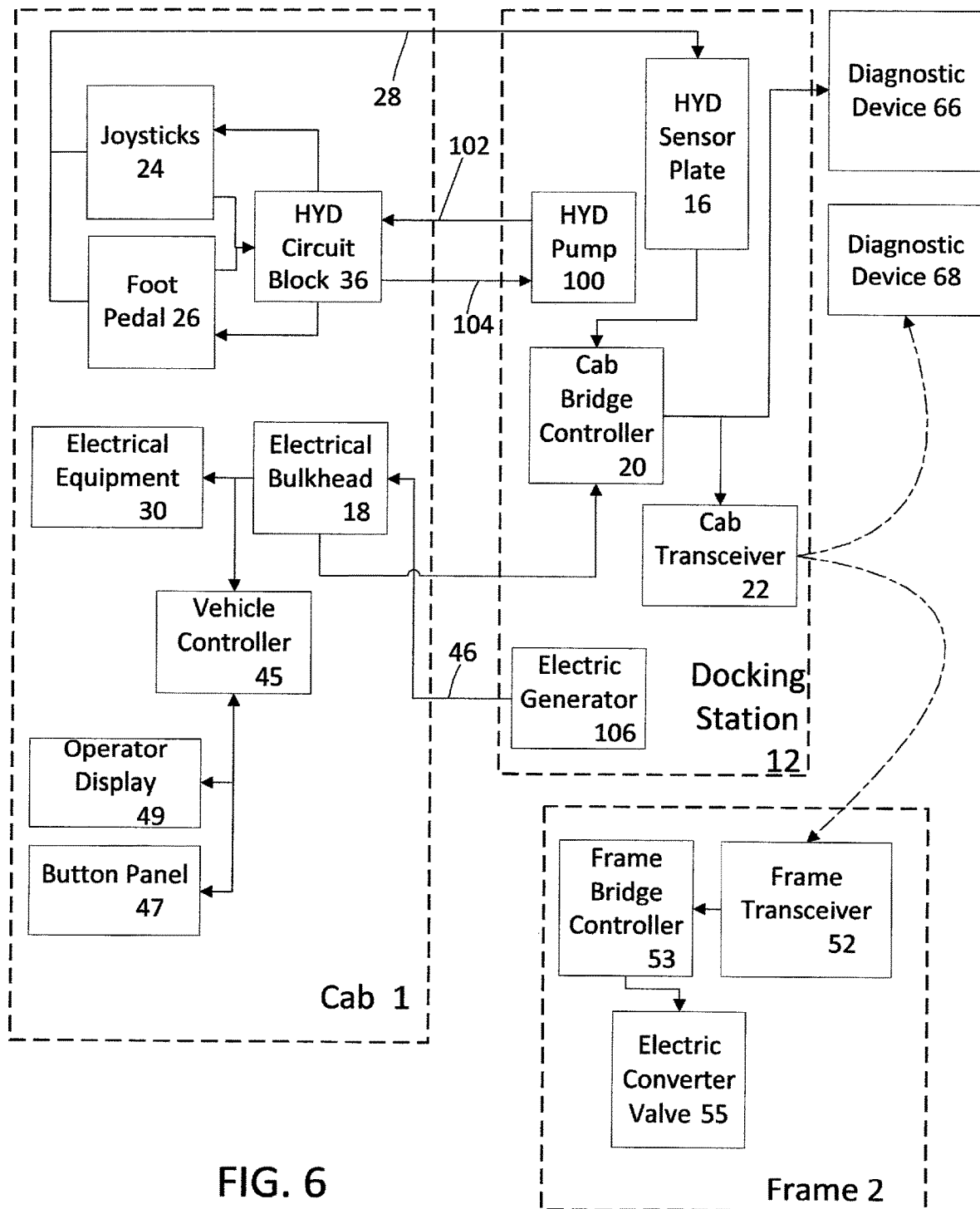
FIG. 6 is a schematic diagram of a remote wireless hydraulic cab illustrating hydraulic and electrical systems in accordance with the present invention.

With reference now to the drawings, and particularly to FIG. 1, there is shown a perspective view of a remote wireless hydraulic cab (hydraulic cab) 1 mounted to a docking station 12. With reference to FIG. 6, the hydraulic cab 1 preferably includes a cab member 10, a hydraulic sensor plate 16, an electrical bulkhead 18, a cab bridge controller 20 and a cab transceiver 22. With reference to FIGS. 2-3, the cab member 10 preferably includes a cab enclosure 14, a plurality of hydraulic joysticks 24, a plurality of hydraulic treadles 26, a plurality of hydraulic lines 28 and electrical equipment 30. With reference to FIGS. 4-5, the hydraulic sensor plate 16 includes a plate member 32, a plurality of quick disconnect adapters 36 and a plurality of threaded adapters 38. One end of the plurality of hydraulic lines 28 are connected to the plurality of joysticks 24 and the plurality of hydraulic treadles 26.

A hydraulic pressure line 102 and a hydraulic return line 104 of a hydraulic pump 100 are connected to an input of a hydraulic circuit block 36. The hydraulic pump 100 distributes hydraulic fluid to the plurality of hydraulic joysticks 24 and hydraulic treadles 26 through the hydraulic circuit block 36. The plurality of quick disconnect adapters 36 are threadably engaged with the plate member 32 on one side thereof. The plurality of threaded adapters 38 are threadably engaged with the plurality of quick disconnect adapters 36 on an opposing side of the plate member 32. A plurality of hydraulic pressure sensors 34 are threaded into the plurality of threaded adapters 38. Hydraulic pressure in the joysticks 24 and foot treadles 26 hydraulic lines 28 are measured by the plurality of hydraulic pressure sensors 34. An electrical output from each hydraulic pressure sensor 34 is connected to the cab bridge controller 20. The electrical bulkhead 18 includes a signal socket 42 and a power socket 44. A signal cable 46 includes a bulkhead plug 48 extending from one end and a controller plug 50 extending from an opposing end. The bulkhead plug 48 is plugged into the signal socket 42 and the controller plug 50 is plugged into the cab bridge controller 20 for transfer of electrical signals from the cab member 10 to the cab bridge controller 20. A vehicle controller 45 is preferably used to receive electrical signals from a button panel 47. The vehicle controller 45 is also used to display information to an operator display 49. The operator display 49 also includes a touch screen. The touch screen may be used to send electrical signals from the operator display 49. The vehicle controller 45 is also connected to the cab bridge controller 20 through electrical bulkhead 18. A remote wireless electric cab would include at least one electrical control device, such as the button panel 47 and the operator display 49, but no hydraulic operated devices. Electrical signals from the button panel 47 and the operator display 49 are preferably sent through the vehicle controller 45 and the electrical bulkhead 18 to the cab bridge controller 20.

An output from the cab bridge controller 20 is connected to the cab transceiver 22. The cab bridge controller 20 converts the electrical signals from the plurality of hydraulic sensors 34, and the vehicle controller 45 into a suitable form for wireless transmission. The cab transceiver 22 transmits the plurality of electrical signals from the plurality of hydraulic pressure sensors 34 and electrical signals from the signal socket 42 to a frame transceiver 52. The frame transceiver 52 sends the electrical signals to a frame bridge controller 53, which in turn sends electrical signals, which control hydraulic proportioning valves in an electro-hydraulic conversion valve 55. A power cable 54 includes a generator plug 56 on one end and a power plug 58 on an opposing end. The generator plug 58 is plugged into an electrical generator 106 and the power plug 56 is plugged into the power socket 44. With the hydraulic pump 100 and the electric generator 106 connections, the remote wireless hydraulic cab 1 is capable of operating remotely with a remote wireless hydraulic frame 2 through wireless communication.

The docking station 12 may be used to provide a physical foundation and an operational base for the remote wireless hydraulic cab 1. The docking station 12 includes a base member 60, the hydraulic pump 100 and the electrical generator 106. The base member 60 includes a support base 62 and at least two upright mounting members 64. A plurality of wheels extend from a bottom of the support base 62. The at least two upright mounting members 64 extend upward from the support base 62. At least one threaded tap or hole is formed through a top of each upright mounting member 64 to receive a retention bolt inserted through a floor 15 of the cab enclosure 14. The hydraulic sensor plate 16, cab bridge controller 20 and the cab transceiver 22 are preferably retained on the support base 62. The hydraulic pump 100 and the electrical generator 106 are attached to a top surface of the support base 62. With reference to FIG. 6, the hydraulic pump 100 is connected to the hydraulic pressure line 102 and the hydraulic return line 104. The electrical generator 106 is connected to the electrical bulkhead 18 through the power cable 46. The docking station 12 enables the remote wireless hydraulic cab 1 to remotely operate from and wireless with the remote wireless hydraulic or wireless frame 2.

However, remote wireless hydraulic cab 1 does not have to be used with the docking station 12. The hydraulic pump 100 and the electrical generator 106 may be connected to the remote wireless hydraulic cab 1 from any other suitable source, besides the docking station 12. The hydraulic sensor plate 16, the cab bridge controller 20 and the cab transceiver 22 would be physically retained on the hydraulic cab 1 and not on the docking device 12. The electric generator 106 may be connected to the remote wireless electric cab from any other suitable source, besides the docking station 12.

A diagnostic device 66 may be connected to the cab bridge controller 20 through a wired connection to monitor hydraulic pressures of the joysticks 24 and foot treadles 26, and status of the buttons of the button panel 47. A diagnostic device 68 may be connected to the cab bridge controller 20 through a wireless connection.

Figure 7:
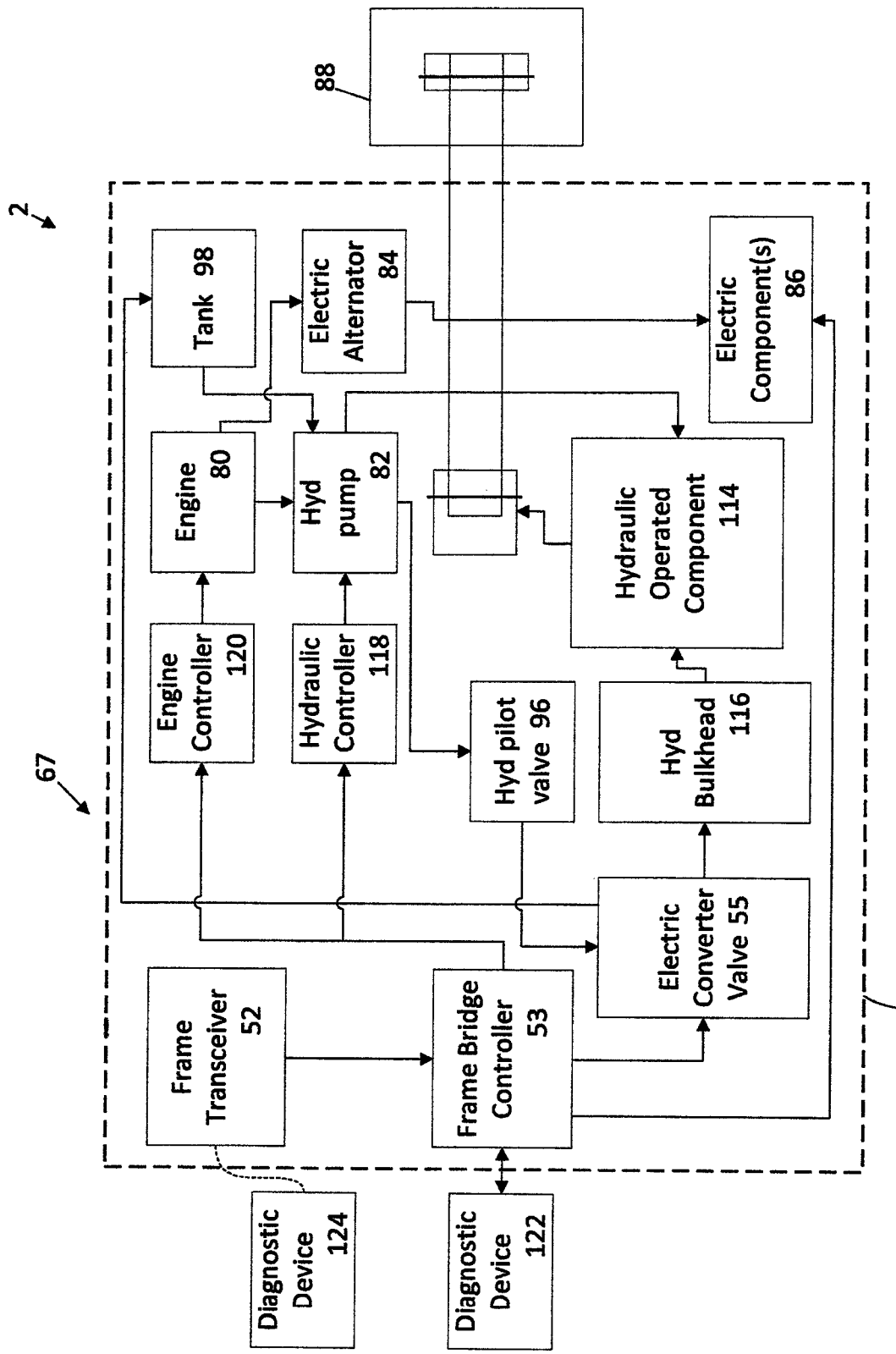
FIG. 7 is a top view of a remote wireless hydraulic frame in accordance with the present invention.
Figure 8:
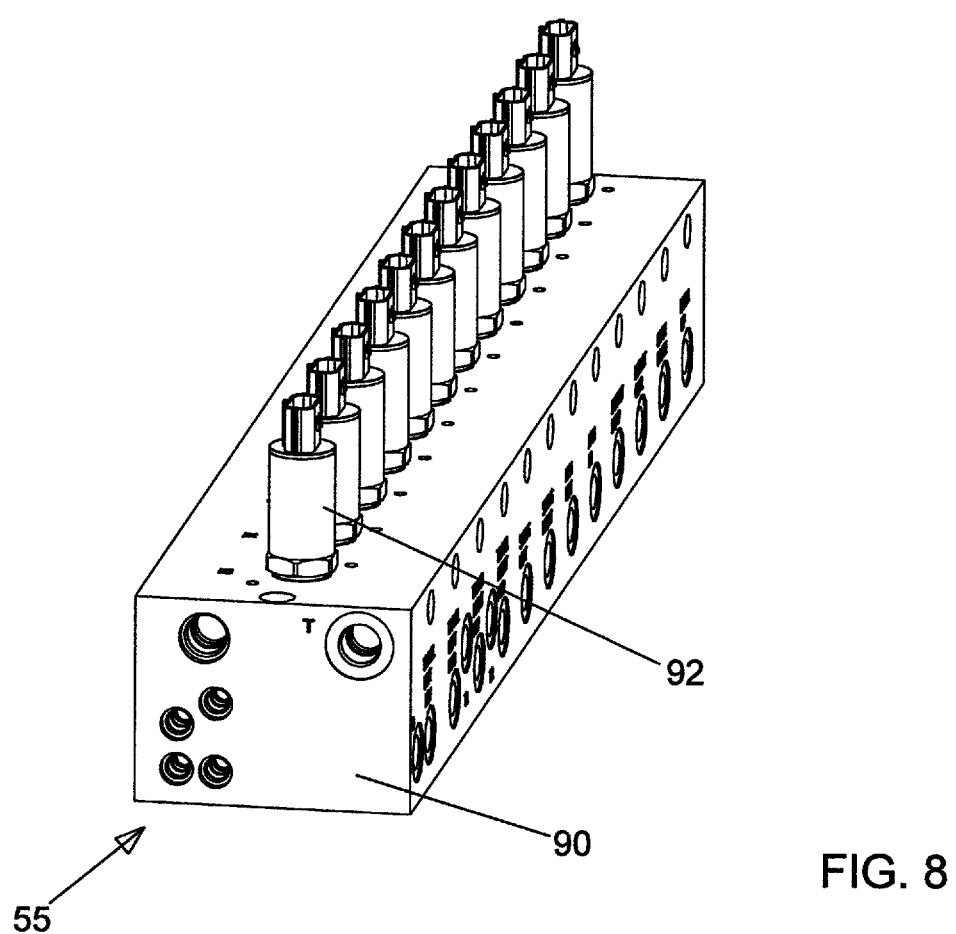
FIG. 8 is an end perspective view of an electro-hydraulic conversion valve of a remote wireless hydraulic frame in accordance with the present invention.
Figure 9:
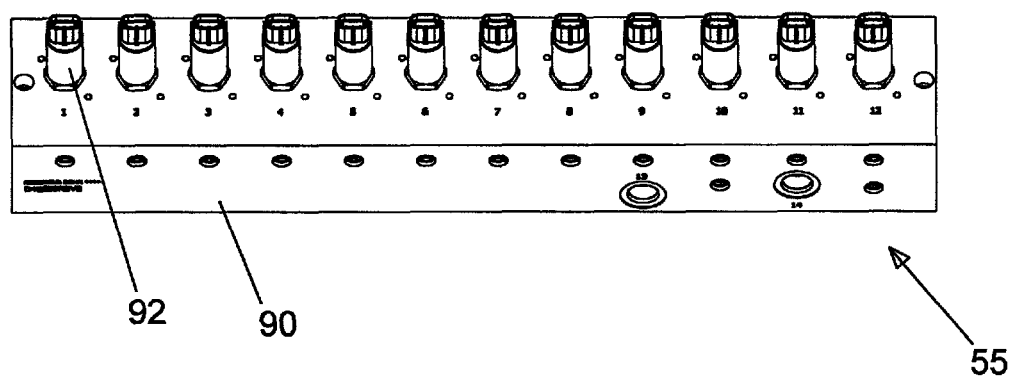
FIG. 9 is a top perspective view of an electro-hydraulic conversion valve of a remote wireless hydraulic frame in accordance with the present invention.
Figure 10:
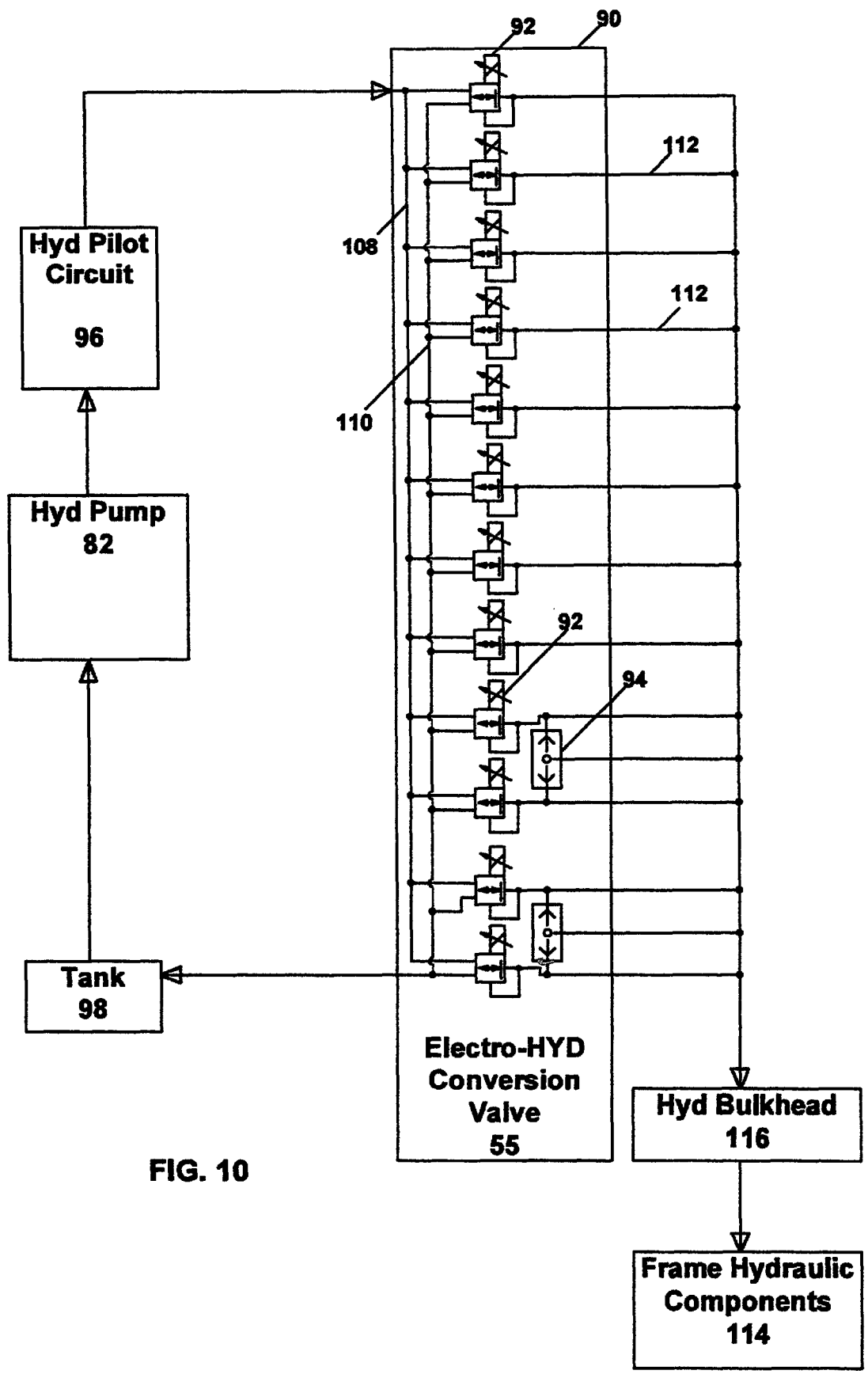
FIG. 10 is a schematic diagram of an electro-hydraulic conversion valve of a remote wireless hydraulic frame in accordance with the present invention.

With reference to FIG. 7, the remote wireless hydraulic frame 2 preferably includes a frame member 67, a frame transceiver 52, a frame bridge controller 53 and an electro-hydraulic conversion valve 55. The frame member 67 preferably includes a frame support 68, an engine 80, a hydraulic pump 82, an electrical alternator 84, at least one electrical component 86 and at least one tool 88. The engine 80, the hydraulic pump 82, the electrical alternator 84, the at least one electrical component 86 and the at least one tool 88 are retained on the frame support 68. The electrical alternator 84 is driven by the engine 80. With reference to FIGS. 8-10, the electro-hydraulic conversion valve 55 preferably includes a valve block 90, a plurality of proportioning valves 92, at least two shuttle valves 94 and a frame pilot hydraulic circuit 96. The valve block 90 includes a plurality of proportioning threaded taps for receiving the plurality of proportioning valves 92; a high side inlet for receiving pressurized hydraulic fluid for the plurality of proportioning valves 92 from the frame pilot hydraulic circuit 96; a return outlet for returning hydraulic fluid from the plurality of proportioning valves 92 to a tank 98 and a plurality of supply outlets for supplying various hydraulic components with pressurized hydraulic fluid. The shuttle valves 94 send an electrical signal to an alarm device, when the remote wireless hydraulic frame 2 is moving.

A supply passage 108 is formed in the valve block 90 to supply the plurality of proportioning valves 92 with hydraulic fluid from the frame pilot circuit 96. A return passage 110 is formed in the valve block 90 to receive hydraulic fluid from the plurality of proportioning valves 92. A supply outlet 112 of each proportioning valve 92 supplies hydraulic pressurized hydraulic to a particular hydraulicly operated component 114 preferably through a hydraulic bulkhead 116. An output pressure of each proportion valve 92 is determined by a hydraulic electrical signal sent from the frame bridge controller 53. The hydraulic electrical signal originates at a hydraulic control device, such as the hydraulic joystick 24 or the hydraulic foot treadle 26. A control electrical signal originates from an electrical control panel 47 or an operator display 49. The electrical control panel 47 includes a plurality of buttons and knobs. The operator display 49 includes a touch screen. The joystick, foot treadle, electrical control panel and touch screen are located in the hydraulic remote cab 1. A hydraulic pressure transmitted from the joystick 24 or foot treadle 26 is converted into the hydraulic electrical signal by the hydraulic pressure sensor 34. The hydraulic electrical signals and control electrical signals are sent to the cab bridge controller 20. The plurality of hydraulic electrical signals and control electrical signals are converted into a suitable protocol by the cab bridge controller 20 and sent to the cab transceiver 22. The cab transceiver 22 wirelessly transmits the hydraulic and control electrical signals to the frame transceiver 52.

The frame bridge controller 53 receives the hydraulic and control electrical signals from the frame transceiver 52 and converts the signals into a suitable form. The hydraulic and control electrical signals are sent from the frame bridge controller 53 to the electro-hydraulic conversion valve 55, a hydraulic controller, an engine controller and the at least one electrical component 86. The hydraulic electrical signals sent to the electro-hydraulic conversion valve 55 operate the plurality of proportioning valves 92 to control the flow of hydraulic fluid to various hydraulicly operated components 114. However, a remote wireless electrical cab could be used with the remote hydraulic frame. The remote wireless electrical cab would have the button panel 47 and the operator display 49, and electrical joysticks and foot treadles, instead of hydraulic joysticks and foot treadles. The hydraulic controller 118 would be used to operate the hydraulic operated components 114 and the at least one tool 88 instead of the electro-hydraulic conversion valve 55. Outlet hydraulic lines 112 from the electro-hydraulic conversion valve 55 preferably include quick coupling ends for retention in a plurality of hydraulic connectors in the hydraulic bulkhead 116. The hydraulic electrical signals are also sent to the hydraulic controller 118. The control electrical signals go to the engine controller or the at least one electrical component 86.

A diagnostic device 122 may be connected to the frame bridge controller 53 through a wired connection to monitor various hydraulic pressures of the frame operated components 114 and status of the hydraulic controller 118, the engine controller 120, and electrical components 86. A wireless diagnostic device 124 may be connected to the cab bridge controller 20 through a wireless connection.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A docking station for supporting a remote wireless hydraulic cab, the remote wireless hydraulic cab communicates with a remote wireless hydraulic frame having at least one tool, comprising:
   a support base;
   at least two mounting members extend upward from said support base, said at least two mounting members are located to align with a bottom of the remote wireless hydraulic cab such that the remote wireless hydraulic cab may be selectively attachable to said at least two mounting members;
   a hydraulic pump is retained on said support base, said hydraulic pump supplies hydraulic fluid to at least one hydraulicly operated device in the remote wireless hydraulic cab; and
   a plurality of pressure sensors are retained relative to said support base, a plurality of hydraulic lines extend from the at least one hydraulicly operated device, said plurality of hydraulic lines are connected to said plurality of pressure sensors, a plurality of hydraulic electrical wires extend from said plurality of hydraulic lines and are connected to a cab bridge controller.

2. The docking station of claim 1, further comprising:
   a cab transceiver is connected to the cab bridge controller to wirelessly transmit data from the cab bridge controller.

3. The docking station of claim 1, further comprising:
   a plurality of wheels extend from a bottom of the base member.

4. The docking station of claim 1 wherein:
   the at least one hydraulicly operated device is at least one of a joystick and a foot treadle.

5. A docking station for supporting a remote wireless hydraulic cab, the remote wireless hydraulic cab communicates with a remote wireless hydraulic frame having at least one tool, comprising:
   a support base;
   at least two mounting members extend upward from said support base, said at least two mounting members are located to align with a bottom of the remote wireless hydraulic cab such that the remote wireless hydraulic cab may be selectively attachable to said at least two mounting members;
   a hydraulic pump is retained on said support base, said hydraulic pump supplies hydraulic fluid to at least one hydraulicly operated device in the remote wireless hydraulic cab;
   a plurality of pressure sensors are retained relative to said support base, a plurality of hydraulic lines extend from the at least one hydraulicly operated device, said plurality of hydraulic lines are connected to said plurality of pressure sensors, a plurality of hydraulic electrical wires extend from said plurality of hydraulic lines and are connected to a cab bridge controller;
   an electrical generator is retained on said support base; and
   at least one electrical control device is supplied with power from said electrical generator, an output of said at least one electrical control device is connected to the cab bridge controller.

6. The docking station of claim 5, further comprising:
   a cab transceiver is connected to the cab bridge controller to wirelessly transmit data from the cab bridge controller.

7. The docking station of claim 5, further comprising:
   a plurality of wheels extend from a bottom of the base member.

8. The docking station of claim 1 wherein:
   the at least one hydraulicly operated device is at least one of a joystick and a foot treadle.

9. The docking station of claim 5, further comprising:
   at least one electrical plug extends from the cab bridge controller for connection to an electrical bulkhead.

10. The docking station of claim 5, further comprising:
    said at least one electrical device includes at least one of a touch screen and a button panel.

11. A docking station for supporting a remote wireless cab, the remote wireless cab communicates with a remote wireless frame having at least one tool, comprising:
    a support base;
    at least two mounting members extend upward from said support base, said at least two mounting members are located to align with a bottom of the remote wireless cab such that the remote wireless cab may be selectively attachable to said at least two mounting members;
    an electrical generator is retained on said support base; and
    at least one electrical control device is supplied with power from said electrical generator, an output of said at least one electrical control device is connected to an electrical bulkhead.

12. The docking station of claim 11, further comprising:
    a cab transceiver is connected to the cab bridge controller to wirelessly transmit data from the cab bridge controller.

13. The docking station of claim 11, further comprising:
    a plurality of wheels extend from a bottom of the base member.

14. The docking station of claim 11, further comprising:
at least one electrical plug extends from the cab bridge controller for connection to an electrical bulkhead.

15. The docking station of claim 11, further comprising:
said at least one electrical device includes at least one of a touch screen and a button panel.

\* \* \* \* \*